United States Patent [19]
Wagner et al.

[11] Patent Number: 5,450,223
[45] Date of Patent: Sep. 12, 1995

[54] OPTICAL DEMULTIPLEXER FOR OPTICAL/RF SIGNALS

[75] Inventors: Harvey L. Wagner, Royersford; Michael S. Margulis, Yardley; Thomas W. Karras, Berwyn, all of Pa.

[73] Assignee: Martin Marietta Corp., East Windsor, N.J.

[21] Appl. No.: 116,674

[22] Filed: Sep. 7, 1993

[51] Int. Cl.[6] .......................... H04J 1/00; H04J 14/00
[52] U.S. Cl. ..................... 359/124; 359/127; 359/172; 359/117; 359/191; 359/193; 359/195
[58] Field of Search ............... 359/124, 126, 127, 128, 359/129, 130, 131, 172, 116, 117, 191, 193, 195, 189; 250/227.23, 199; 385/15, 14, 37, 130; 370/23, 53

[56] References Cited

U.S. PATENT DOCUMENTS

| | | | |
|---|---|---|---|
| 3,755,676 | 8/1973 | Kinsel . | |
| 4,198,117 | 4/1980 | Kobayashi | 350/96.19 |
| 4,468,766 | 8/1984 | Spezio | 370/3 |
| 4,773,063 | 9/1988 | Hunsperger et al. | 370/3 |
| 4,932,742 | 6/1990 | Tohme | 350/96.18 |
| 4,976,520 | 12/1990 | Brandstetter et al. | 350/384 |
| 5,099,114 | 3/1992 | Matsumoto et al. | 250/227 |
| 5,162,748 | 11/1992 | Katz | 330/149 |

OTHER PUBLICATIONS

"Design of a High Performance Wideband Acousto-Optic Heterodyne Channelizer", by Yee et al., publ. at pp. 265–275 of SPIE vol. Advances in Optical Information Processing IV (1990).

"Spurious Modulation and Bandshape in Interferometric RF Channelized Receivers", by Lantz, publ. at pp. 119–129 of SPIE vol. 1291 Optical and Digital GaAs Technologies for Signal-Processing Applications (1990)

"Crossed Bragg Cell Implementation of an Interferometric Spectrum Analyzer", by Wood, published at pp. 261–264 of SPIE vol. 1296 Advances in Optical Information Processing IV (1990).

"Optical Multiplexing of Data Signals", by B. G. Feller, IBM Technical Disclosure Bulletin, vol. 22, No. 1, Jun. 1979.

Primary Examiner—Hezron E. Williams
Assistant Examiner—Richard A. Moller
Attorney, Agent, or Firm—W. H. Meise; C. A. Berard; S. A. Young

[57] ABSTRACT

An optical demultiplexer includes an electrooptic modulator (410) which modulates a beam of light (418) in response to frequency-multiplexed radio-frequency (RF) information signals, to produce diverging beamlets of light (420). The diverging beamlets are separated by a spatial separator arrangement (426), and each beamlet (420), including the information of its RF carrier, is coupled to a separate optical detector (428). The detector (428) can extract amplitude modulation from the signal. In order to reconstruct the RF signal as well as the amplitude modulator, an optical "local oscillator" signal (OLO) is coupled to each detector together with its information signal. Signal loss due to vibration or misalignment is avoided, and heterodyne mixing efficiency is maximized in an embodiment of the invention, by propagating the OLO and information signals through a single-mode optical fiber to the detector. In a particular embodiment of the invention, the OLO signal is applied to a first fiber (622), the information signal is applied to a second fiber (610), and the first and second fibers are coupled together by a fiber-optic coupler (612). In another embodiment of the invention, the OLO signal results from generating an RF L.O. signal, and combining the RF L.O. local signal with the information signals before application to the electrooptic modulator, to generate an OLO beamlet (720) which is subject to the same vibration and misalignment as the signal beamlets.

20 Claims, 5 Drawing Sheets

OPTICAL DEMULTIPLEXER FOR OPTICAL/RF SIGNALS

FIELD OF THE INVENTION

This invention relates to demultiplexing arrangements for frequency-multiplexed radio-frequency (RF) signals or carriers, and more particularly to arrangements for optically demultiplexing radio-frequency signals, which find particular use in spacecraft.

BACKGROUND OF THE INVENTION

Geosynchronous communications satellites and spacecraft have come into widespread use for receiving uplink signals transmitted from ground stations, and for retransmitting downlink signals back to other ground stations. Because of the limited number of geosynchronous "slots" or locations, and because of the very high capital cost of such spacecraft, both in construction and launch, each spacecraft must handle as many "channels" or independent signals as possible.

In order to simultaneously process several independent signals without crosstalk, some kind of multiplexing scheme must be adopted. One of the more popular multiplexing schemes is frequency division multiplexing, in which each independent information signal is transmitted on an RF carrier signal having a frequency different from the frequency of other RF carriers which carry other independent information signals. An advantage of such an arrangement is that, if desired, independent information signals, encoded onto appropriate RF carriers, may be transmitted to the spacecraft from a plurality of different locations on the Earth's surface, whereas some other multiplexing schemes, such as polarization or phase multiplexing, cannot readily be achieved from disparate locations. The communications spacecraft receives the RF signals, preamplifies and filters the received signals as necessary for noise control, and then demultiplexes the signals to separate the RF signals, so that each independent RF signal flows through a different channel or path. Within its path, each RF signal can be further processed, as by amplification. Ultimately, the processed, demultiplexed RF signals are recombined or multiplexed, often in a frequency-translated form, for retransmission back toward Earth.

As a result of the aforementioned high cost of each spacecraft, it is very desirable to continue use of an operating spacecraft for as long a time as possible. While equipment degradation or failure may result in removal of a communication spacecraft from service, the maximum lifetime is determined, in the absence of equipment failures, by the time required to consume the propellant which is used for attitude control and stationkeeping. Consequently, there is an economic incentive to reduce the total weight of the spacecraft, so as to be able to maximize the amount of propellant which can be launched into orbit.

The conventional demultiplexer in a communications spacecraft consists of an array of waveguide filters or resonators, each tuned to a different one of the various signal or RF carrier frequencies, all of which resonators are coupled in parallel to receive the multiplexed signal, and each of which has an output port to which one of the demultiplexed carriers is coupled. In order to avoid excessive signal losses, the waveguide filters must be relatively large, with physical dimensions of at least one quarter wavelength ($\lambda/4$), but often more. At the frequencies commonly in use for such communications, which range from the radar L-band to X-band, or about 0.5 GHz to 10 GHz, the RF carrier free-space wavelengths range from about twenty-four inches to one inch, respectively. Demultiplexers of this sort tend to be large and heavy. Improved demultiplexers are desired.

SUMMARY OF THE INVENTION

A demodulator includes an electrically driven acoustooptic modulator which spatially modulates a beam of light in response to radio-frequency (RF) information signals, to produce diverging information beamlets of light. The diverging beamlets are separated by a spatial separator, and each beamlet, including the information of its RF carrier, is coupled to a separate optical detector. The detector extracts the information portion of the signal. In order to reconstruct the RF signal as well as the information, an optical "local oscillator" signal (OLO) is coupled to each detector together with its information beamlet. Signal loss due to vibration or misalignment is avoided, and heterodyne mixing efficiency is maximized in an embodiment of the invention, by propagating the OLO and carrier signals through a single-mode optical fiber to the detector. In a particular embodiment of the invention, the optical local oscillator (OLO) signal is applied to a first fiber, the information carrier signal is applied to a second fiber, and the first and second fibers are coupled together by a fiber-optic coupler. In another embodiment of the invention, the optical local oscillator signal results from generating a radio-frequency local oscillator signal, and combining the radio-frequency local oscillator signal with the information carrier signals before application to the acoustooptic modulator, to generate an optical local oscillator beamlet which is subject to the same vibration and misalignment as the signal beamlets.

DESCRIPTION OF THE INVENTION

Figure 1:
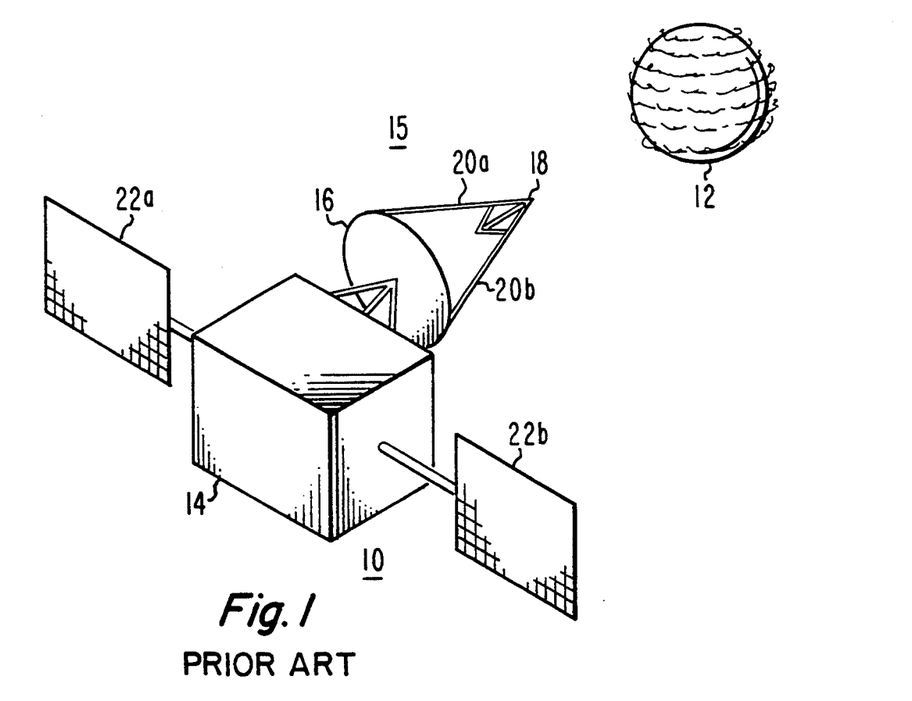
FIG. 1 is a simplified perspective or isometric view of a spacecraft according to the invention.

FIG. 1 is a view of a simplified communications spacecraft 10 orbiting a heavenly body 12, such as Earth. Spacecraft 10 includes a body 14, which supports an antenna 15 represented as a reflector 16 with a feed 18, supported by struts 20a and 20b. Spacecraft 10 receives signals from heavenly body 12 by means of antenna 15, and includes signal processing circuits (not illustrated in FIG. 1) for processing the received signals to prepare them for retransmission back to body 12, either by way of antenna 15 or by some other means (not illustrated). Electricity for operating the housekeeping equipment and the abovementioned signal processing circuits is generated by solar panels 22a and 22b.

Figure 2:
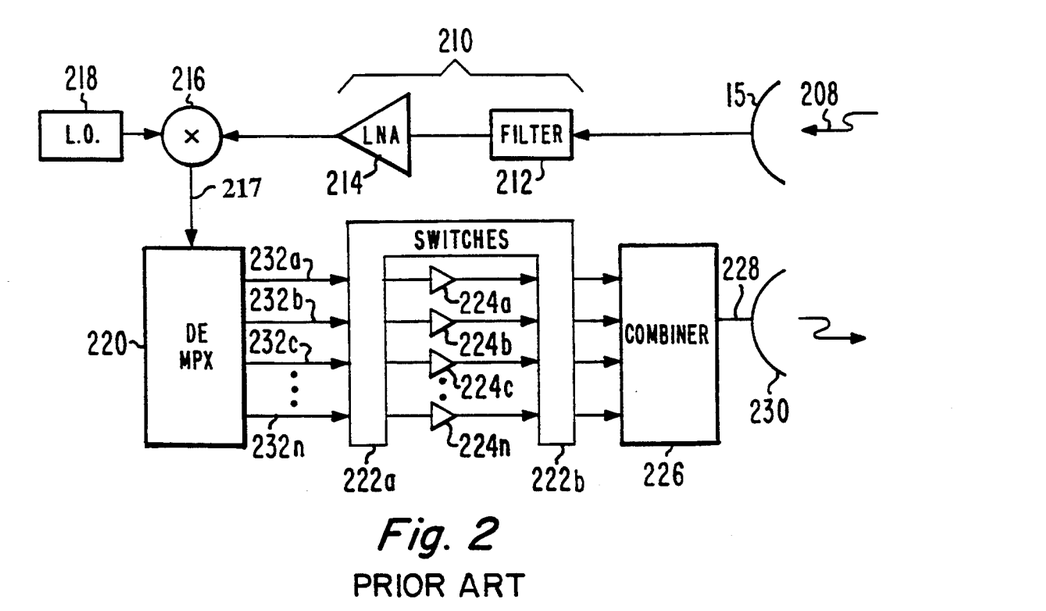
FIG. 2 is a simplified block diagram of a prior art communications system which may be used in the spacecraft of FIG. 1.

FIG. 2 illustrates prior-art communications equipment which may be used in satellite 10 of FIG. 1, as described in more detail, for example, in U.S. Pat. No. 5,162,748, issued Nov. 10, 1992, in the name of Katz. In FIG. 2, uplink RF information signals, illustrated as 208, and at a plurality of different frequencies, are received by antenna 15. The received signals are applied to an input signal processor 210, which includes the cascade of a filter 212 and a low-noise amplifier (LNA) 214, which may be cascaded in an order opposite to that illustrated. The amplified, filtered signals from processor 210 are block downconverted by a converter including a mixer 216 and local oscillator (LO) 218. The downconversion might, for example, convert a number of carriers near 6 GHz to a frequency range near 4 GHz. The down-converted RF signals are applied by way of a transmission path 217 to a prior-art frequency demultiplexer 220, described below in conjunction with FIG. 3. The demultiplexed signals at different frequencies are individually applied from demultiplexer 220 of FIG. 2 by way of individual signal paths 232a, 232b, . . . 232n to the input portion 222a of a redundancy switch arrangement illustrated as 222. The demultiplexed signals applied to input switch portion 222a are coupled through various amplifiers 224a, 224b, . . . 224c, 224d, to amplify the signals. The amplified, demultiplexed signals are applied from amplifiers 224, through an output portion 222b of redundancy switch arrangement 222, to a signal multiplexer or combiner 226, which recombines the amplified signals onto a single path or channel 228. The combined signals on path 228 are retransmitted over a downlink path to Earth, as by a transmit antenna 230. As known, transmit antenna 230 may be a portion of antenna 15.

Figure 3:
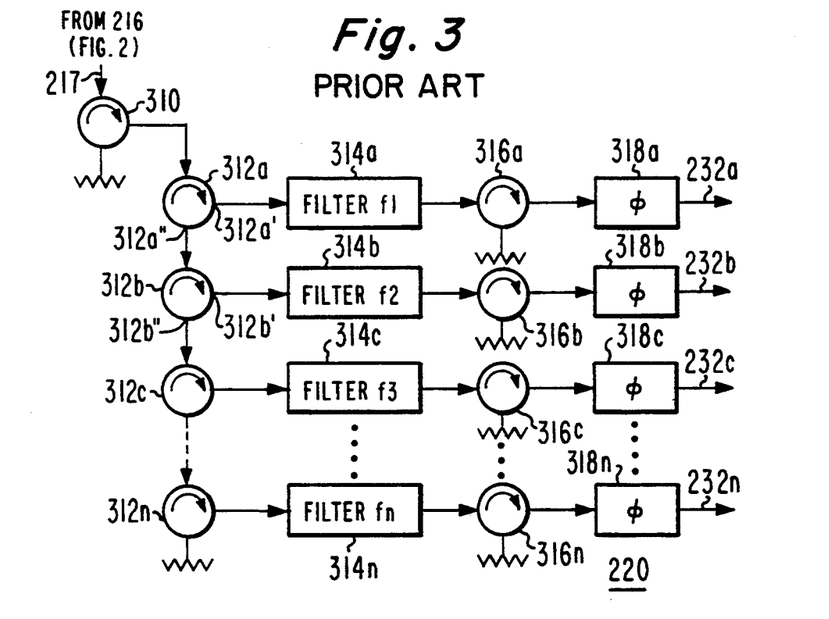
FIG. 3 is a simplified block diagram of a demultiplexer portion of the system of FIG. 2.

A basic prior-art demultiplexer includes a plurality of tuned-circuit resonators or filters coupled to a common source transmission line, with all the resonators coupled to each other by way of the common transmission line. Such arrangements may be difficult to align, due to interaction among the resonators. FIG. 3 illustrates a prior-art demultiplexer which may be used in the arrangement of FIG. 2, and in which isolators and circulators are used to reduce the coupling among the individual filters. In FIG. 3, the frequency-multiplexed signals which are to be demultiplexed are applied to an isolator-coupler circulator 310, which is essentially a 3-port circulator with a matched load coupled to one of the ports, to thereby form a unidirectional (isolating) 2-port device. From isolator 310, the signal is applied through a cascade of 3-port circulators 312a, 312b, 312c, . . . 312n, where circulator 312n, being at the end of the cascade, is connected as an isolator. Each circulator 312 couples all its input signal in the direction of the arrow to its first adjacent output port, designated by a prime. Thus, RF signals at all the frequencies are initially circulated by circulator 312a from its input port to its output port 312a', whence the RF signals flows to channelizing filter 314a. Signals at the frequency of filter 314a pass through filter 314a, and all the remaining RF signals are reflected by filter 314a. Thus, if input signals at frequencies f1, f2, f3, . . . fn are applied to circulator 312a from isolator 310, all of those input signals are applied to filter 314a, which passes frequency f1, and reflects signals at frequencies f2, f3, . . . , fn back to port 312a' of circulator 312a. Circulator 312a circulates the signals reflected from filter 314a by way of its next adjacent output port 312a" to the input port of the next circulator of the cascade, which is circulator 312b. Circulator 312b circulates signals at frequencies f2, f3, . . . fn to its next adjacent port 312b', from which the signals are applied to channelizing filter 314b, which is tuned to frequency f2. Filter 314b passes signal at frequency f2, and reflects signal at frequencies f3, . . . fn back to port 312b' of circulator 312b. Circulator 312b circulates signals at frequencies f3, . . . fn by way of its next adjacent port 312b" to the input port of circulator 312c. In general, each circulator 312 couples all the input signals to the next circulator in the cascade, except for that one signal of the frequency to which its corresponding channelizing filter 314 is tuned. Thus, at each stage of the cascade, one of the signals is coupled away through the filter, while the remaining signals continue through the chain. Only the signal at frequency fn arrives at the input port of isolator 312n, and it is coupled through filter 314n, tuned to frequency fn. Thus, the input signals, frequency multiplexed when received at isolator 310, are separated or demultiplexed according to frequency.

Also in FIG. 3, each channelizing filter 314a, 314b, 314c, . . . 314n has a further isolator 316a, 316b, 316c, . . . 316n, respectively, coupled to its output, to prevent interaction with a phase ($\phi$) corrector 318a, 318b, 318c, . . ., 318n, respectively. The phase-connected channelized output signals appear individually on output paths 232a, 232b, 232c, . . . 232n.

Figure 4:
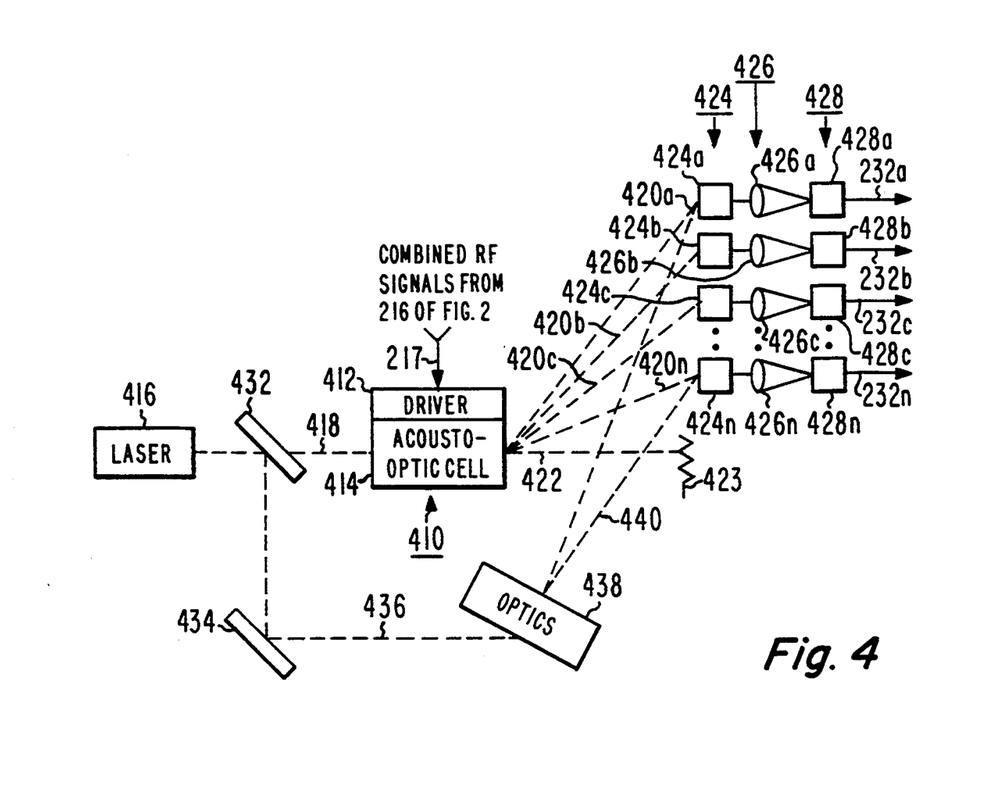
FIG. 4 is a simplified block diagram of an optical demultiplexer according to an aspect of the invention.

FIG. 4 illustrates an optical RF demultiplexer according to the invention which may be used in the arrangement of FIG. 2. In FIG. 4, the combined frequency-multiplexed RF signal carriers are applied over signal path 217 to an electrically driven acoustooptic or electrooptic cell 410, which, as known in the art, may include an electroacoustic or piezoelectric driver 412 to which the RF signals are applied, which generates bulk acoustic waves in a medium 414, which affect the index of a refraction in an acoustic wave travelling through the medium, producing an optical grating effect. A laser 416 produces a coherent beam of incident light 418 which is applied through cell 410, producing an output light beam 422, which is absorbed in a termination 423.

Within cell 410 of FIG. 4, acoustic modulation of the light beam under the influence of the combined RF signals causes a portion of the power in the incident light beam 418 to be spatially modulated or diffracted, so that each RF signal carrier results in generation of a separate "beamlet" of light 420a, 420b, 420c, . . . 420n, where n represents the number of disparate RF signal carrier frequencies. The spatially modulated light beamlets leave acoustooptic cell 410 at an angle relative to the output light beam 422, which represents the power remaining in incident light beam 418 after removal of the power resulting from the spatial modulation and generation of beamlets 420a, 420b, 420c, . . . 420n. The angle at which the beamlet leaves cell 410 depends upon the frequency of the RF carrier which generates the beamlet. While separate, discrete "beamlets" are described, the region between beamlets also contains a spectrum of light energy at a lower level, attributable to modulation of the RF carriers, noise and other effects.

A planar light aperture array or mask 424, including apertures 424a, 424b, 424c, . . . 424n, may be interposed to intercept beamlets 420a, 420b, 420c, . . . , 420n, to pass the beamlets attributable to the desired modulation, and to block any light energy attributable to unwanted or low-level RF signals, or spatial modulation distortion. If the light beamlets are well separated, the masking aperture array may not be necessary. Each separated light beamlet 420a, 420b, 420c, . . . 420n, whether or not it passes through a masking aperture, reaches a focussing lens or optical system 426a, 426b, 426c, . . . 426n of an array 426. Each lens or optical system 426a, 426b, 426c, . . . 426n focuses its corresponding beamlet 420a, 420b, 420c, . . . 420n onto a photosensor or photodetector 428a, 428b, 428c, . . . 428n, respectively, of a photodetector array 428. Each photodetector converts the light beamlet falling thereon to an electrical signal on a corresponding output conductor 232a, 232b, 232c, . . . 232n.

As so far described, the arrangement of FIG. 4 including laser 416, acoustooptic modulator 410, aperture array 424, lens array 426, and detector array 428 is capable of extracting any amplitude modulation or information modulation contained in the RF signal carriers applied to modulator 410, but the RF carriers themselves cannot be recovered. If the RF carriers are FM-modulated or phase-modulated, detectors of array 428 cannot extract the modulation information. True frequency demultiplexing requires that the RF carriers themselves be available in the demultiplexed channels, together with their modulation. The RF carrier information can be recovered from the demultiplexed signal by applying a light signal, which may be thought of as being an optical local oscillator (OLO) signal, to each photodetector of array 428. In FIG. 4, the light local oscillator signal is extracted from light beam 418 by means of a beam splitter such as half-silvered beam splitting mirror 432 and a further mirror 434, which directs a laser local oscillator beam 436 toward a diverging optical system 438. Optical system 438 converts light beam 436 into a diverging OLO light beam 440. Light beam 440 passes through the apertures of array 424, and each portion so passed is focused, together with the information signal beamlets 420, onto the corresponding photodetector. An interaction occurs in the photodetector, by which the RF signal carrier is regenerated. This regeneration occurs because each information signal beamlet leaving modulator 410 has a frequency modulation or frequency offset component corresponding to the originating RF signal carrier frequency, while the light OLO signal does not contain such a frequency offset. The photodetector, therefore, produces at least the difference frequency, which is the original RF signal carrier frequency.

Figure 5A:
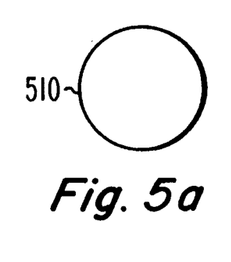
FIGS. 5a–5c, where the hyphen represents the word "through", illustrate light spots on the detector of FIG. 4 without beam misalignment, and with various degrees of misalignment.

It has been found that the arrangement of FIG. 4 operates as described above, but that the wavefront of each light beamlet focused upon a photodetector 428 of FIG. 4 must be parallel to the wavefront of the light OLO signal within a few milliradians, in order to produce proper detection. This may be understood by reference to FIGS. 5a–5c, in which FIG. 5a represents, as a single spot 510, the superposed information-carrying beamlet and OLO beamlet light spots focussed onto one of the photodetectors, when the beamlets are incident in a mutually parallel manner. Remembering that the information-carrying beamlet and the OLO beamlet differ in frequency by the RF signal carrier frequency, light spot 510 may be conceived of as "flashing" on and off (i.e. becoming light and dark) at the RF signal carrier frequency, as the two superposed light spots become alternately in-phase and antiphase. The photodetector responds to the presence and absence of light to produce an electrical signal at the RF carrier frequency, which is a part of the desired output signal. While the RF carrier information modulation has not been discussed in this regard, it will be understood that the information modulation is also reconstructed, so that the output of the photodetector is a replica of one of the original RF signal carriers.

Figure 5B:
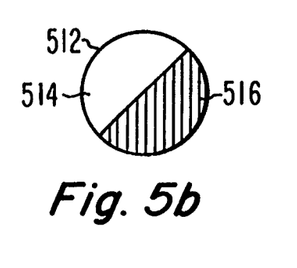
Figure 5C:
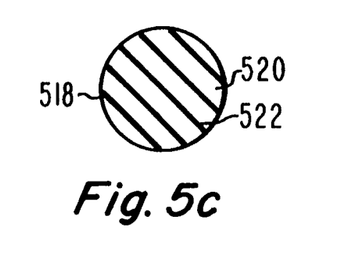

FIG. 5b represents, as a spot 512, the superposed focused spots, when the wavefront of one of the incident information-carrying beamlets 420 of FIG. 4 is not quite parallel to the corresponding wavefront of one of the OLO beamlets falling onto a photodetector 428 of FIG. 4, so that one cycle of fringing occurs across spot, as suggested by the light region 514 and "dark" or shaded region 516. The light and dark regions 514, 516 of spot 512 of FIG. 5b may be thought of an alternating from light to dark and from dark to light, respectively, in mutual antiphase, at the RF signal carrier frequency. In principle, one might expect that, since the total amount of light is more or less invariant over one RF carrier cycle, or interval, that the output of the photodetector would be zero. In actuality, the photodetector output signal magnitude decreases, but does not become negligible until the parallelism of the information beamlet and the L.O. beamlet wavefronts results in several interference fringes across the light spot, as suggested by region 518 of FIG. 5c, with light regions 520 and dark regions 522. While the structure of FIG. 4 is smaller and lighter than the prior art resonator-type demultiplexer, it is believed that it may be difficult and costly to attempt to maintain a physical structure corresponding to that illustrated in FIG. 4 mechanically stable in the vibration and temperature environment of a spacecraft.

Figure 6:
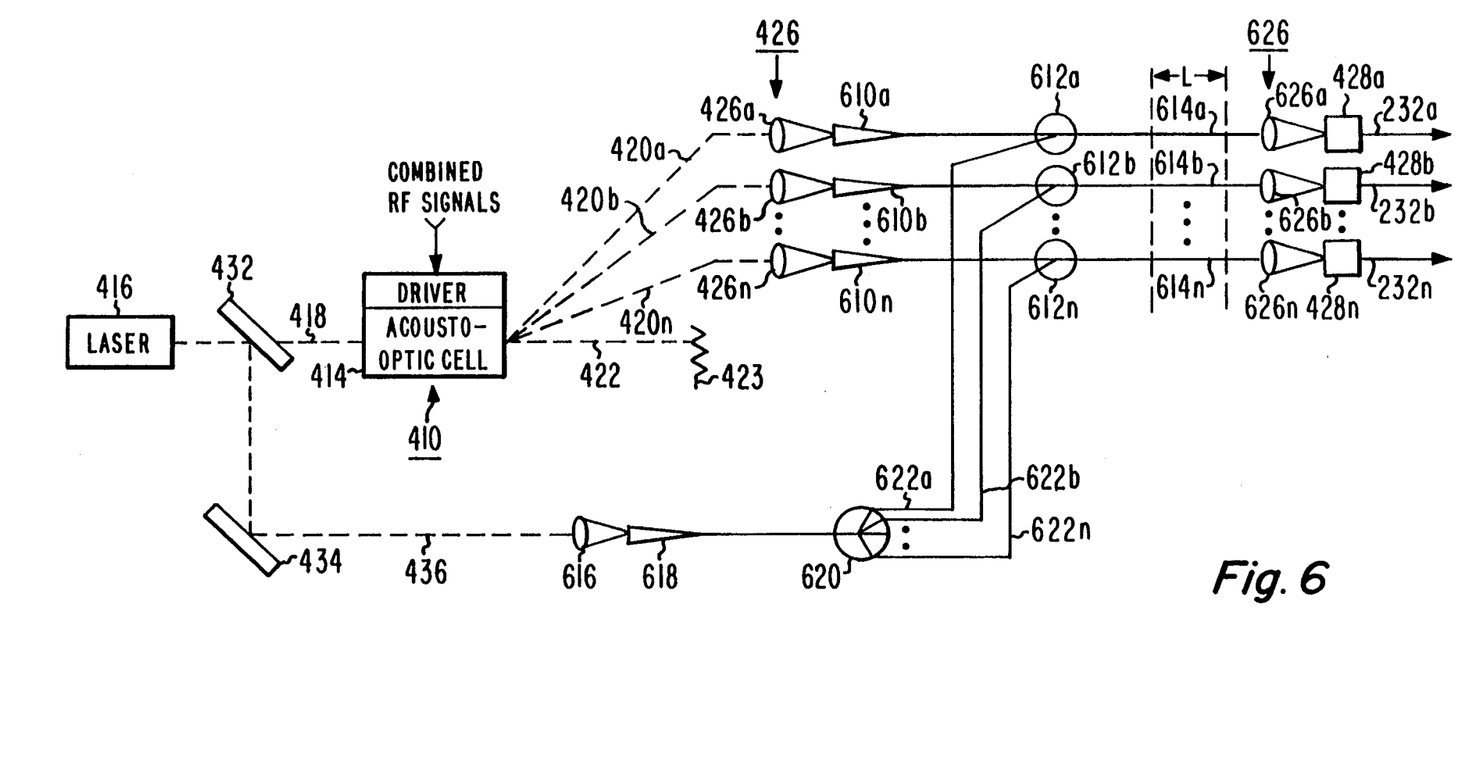
FIG. 6 is a simplified diagram of an optical RF demultiplexer according to another aspect of the invention, in which the optical local oscillator and information light beams are coupled together through a single-mode optical fiber.

FIG. 6 illustrates a demultiplexer according to an aspect of the invention. FIG. 6 is similar to FIG. 4, and elements of FIG. 6 corresponding to those of FIG. 4 are designated by like reference numerals. In FIG. 6, local oscillator light (OLO) beam 436 is focused by a lens 616 into an optical fiber 618, which is coupled to a star coupler or equivalent power division coupler 620. Coupler 620 divides the OLO power, and couples a portion of the power into a plurality of optical fibers 622a, 622b, . . . 622n. The information signal beamlets 420a, 420b, . . . 420n are applied, through an aperture array (not illustrated) if required, to focusing lenses 426a, 426b, . . . 426n of lens array 426. Each lens of array 426 focuses its beamlet onto the input end of a corresponding optical fiber. For example, information beamlet 426a is focussed by lens 426a into a fiber 610a, information beamlet 426b is focussed into optical fiber 610b by lens 426b, . . . , and information beamlet 426n is focussed into optical fiber 610n by lens 426n. Each separate optical information signal propagates through its respective optical fiber 610 to an optical coupler or combiner 612, which also receives OLO signal from a corresponding optical fiber 622. More specifically, optical combiner 612a receives optical information signal from optical fiber 610a and optical L.O. signal from optical fiber 622a; optical combiner 612b receives optical information signal from optical fiber 610b and optical L.O. signal from optical fiber 622b; . . . ; and optical combiner 612n receives optical information signal from optical fiber 610n and optical L.O. signal from optical fiber 622n. Each combiner 612 of FIG. 6 linearly adds or combines the optical information and optical local oscillator signals, and applies them together over a single-mode optical fiber 614 having a length L sufficient to damp high order modes and so cause the two optical signals to achieve wavefront parallelism. In FIG. 6, combiner 612a applies the combination of one of the optical information signals and the L.O. signal through a length L of single-mode optical fiber 614a and a focussing lens 626a to photodetector 428a, combiner 612b applies the combination of one of the optical information signals and the L.O. signal through a length L of single-mode optical fiber 614b and a focussing lens 626b to photodetector 428b, . . . , and combiner 610n applies the combination of one of the optical information signals and the L.O. signal through a length L of single-mode optical fiber 614n and a focussing lens 626n to photodetector 428n. Since the wavefront of the optical information signal in each single-mode fiber is parallel to the wavefront of the optical L.O. signal, the superposed spots focussed onto each photodetector exhibit little or no fringing. The beam parallelism is maintained even if the optical fibers vibrate or change temperature, because both optical signals traversing the fiber vibrate or move together.

Figure 7A:
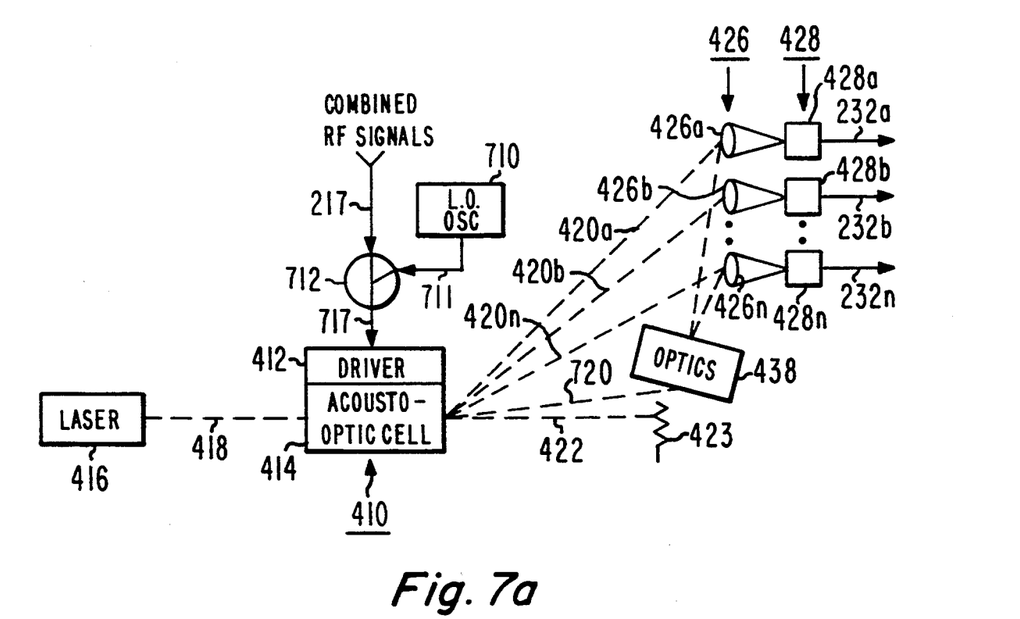
FIG. 7a is a simplified diagram of an optical RF demultiplexer according to another aspect of the invention, in which the optical local oscillator signal is generated as a further beamlet diverging from the other beamlets.

FIG. 7a illustrates another aspect of the invention. Elements of FIG. 7a corresponding to those of FIG. 4 are designated by like reference numerals. In FIG. 7a, a source 710 of unmodulated R.F. local oscillator signal is coupled by a transmission path 711 and a directional coupler or combiner 712 to combined RF signal transmission line 217, so that combined RF information signal carriers and the RF L.O. signal are applied over a path 717 to piezoelectric drive 414 of acoustooptic modulator 410. The bulk acoustic waves produced by driver 412 in cell 414 modulate laser light beam 418 with the RF L.O. signal in addition to the RF information signals, thereby producing, in addition to the information beamlets 420a–420n, an additional OLO beamlet illustrated as 720. Beamlet 720 is processed by diverging optics illustrated as 438, to cause the energy of the OLO beamlet to be applied to all lenses 426a, 426b, . . . , 426n of lens array 426, whence the optical information beamlets 420 and OLO signal are applied together to the photodetectors of array 428 as in the case of FIG. 4. With the arrangement of FIG. 7a, the optical L.O. signal as generated is subject to the same vibration and temperature effects as the RF information signals, so should be more stable than the arrangement of FIG. 4 in the presence of temperature variations and vibration.

Unlike the arrangement of FIG. 4, the output carrier of each photodetector 428 of FIG. 7a is offset in frequency from the original carrier by the frequency of RF L.O. source 710. In the context of a communications satellite such as one including the system of FIG. 2, this frequency offset may not be of consequence, because a frequency conversion between the received uplink signals and the resulting downlink signals is provided as part of the system operation, as described in the case of FIG. 2 by a frequency converter including L.O. 218 and mixer 216. The frequency offset provided by the scheme of FIG. 7a may be taken into account in such a system by simply providing part of the desired frequency conversion by means of a first converter as in FIG. 2, and providing the remaining part of the frequency conversion as in FIG. 7a. In principle, there is no reason that the entirety of the frequency conversion, for certain frequencies, cannot be supplied by the arrangement of FIG. 7a, thereby obviating the need for the frequency converter including L.O. 218 and mixer 216 of FIG. 2.

Figure 7B:
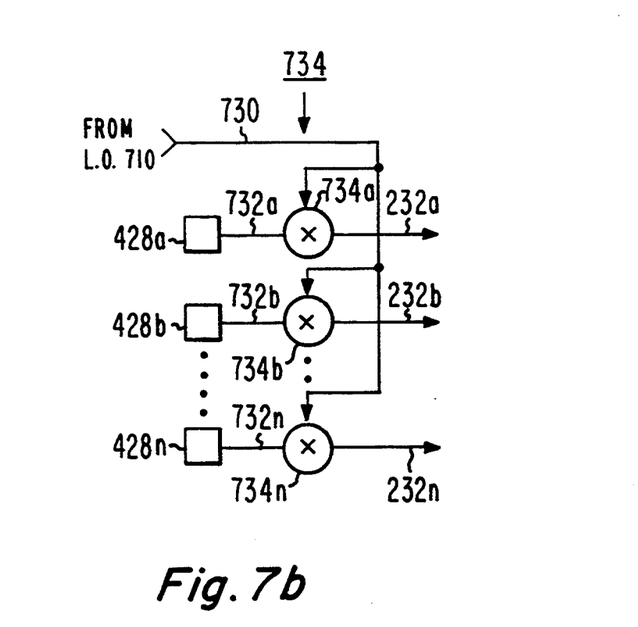
FIG. 7b represents a portion of the arrangement of FIG. 7a modified to perform a compensatory frequency conversion.

In the event that the abovementioned frequency offset is undesirable, a reconversion may be provided by the arrangement of FIG. 7b, in which elements corresponding to those of FIG. 7a are designated by like reference numerals. In FIG. 7b, the RF L.O. signal from block 710 of FIG. 7a is applied over a signal path 730, in common, to an array of mixers 734. Each mixer of array 724 also receives the reconstructed frequency converted RF information signal carrier from an associated photodetector 428, and forms the sum- and difference-frequency mixing operation in the usual manner. The desired one of the sum and difference frequencies may be selected for further use, and filtered by an RF filter (not illustrated) if desired. For example, if the RF local oscillator signal produced by generator 710 of FIG. 1 has a frequency which differs from the RF information signal carrier frequency by one-half the total desired frequency conversion, the total downconversion may be accomplished in two stages by the arrangement of FIG. 7a in conjunction with FIG. 7b, with half of the frequency conversion occurring in the detectors 428, and the other half in the mixers 734.

Figure 8:
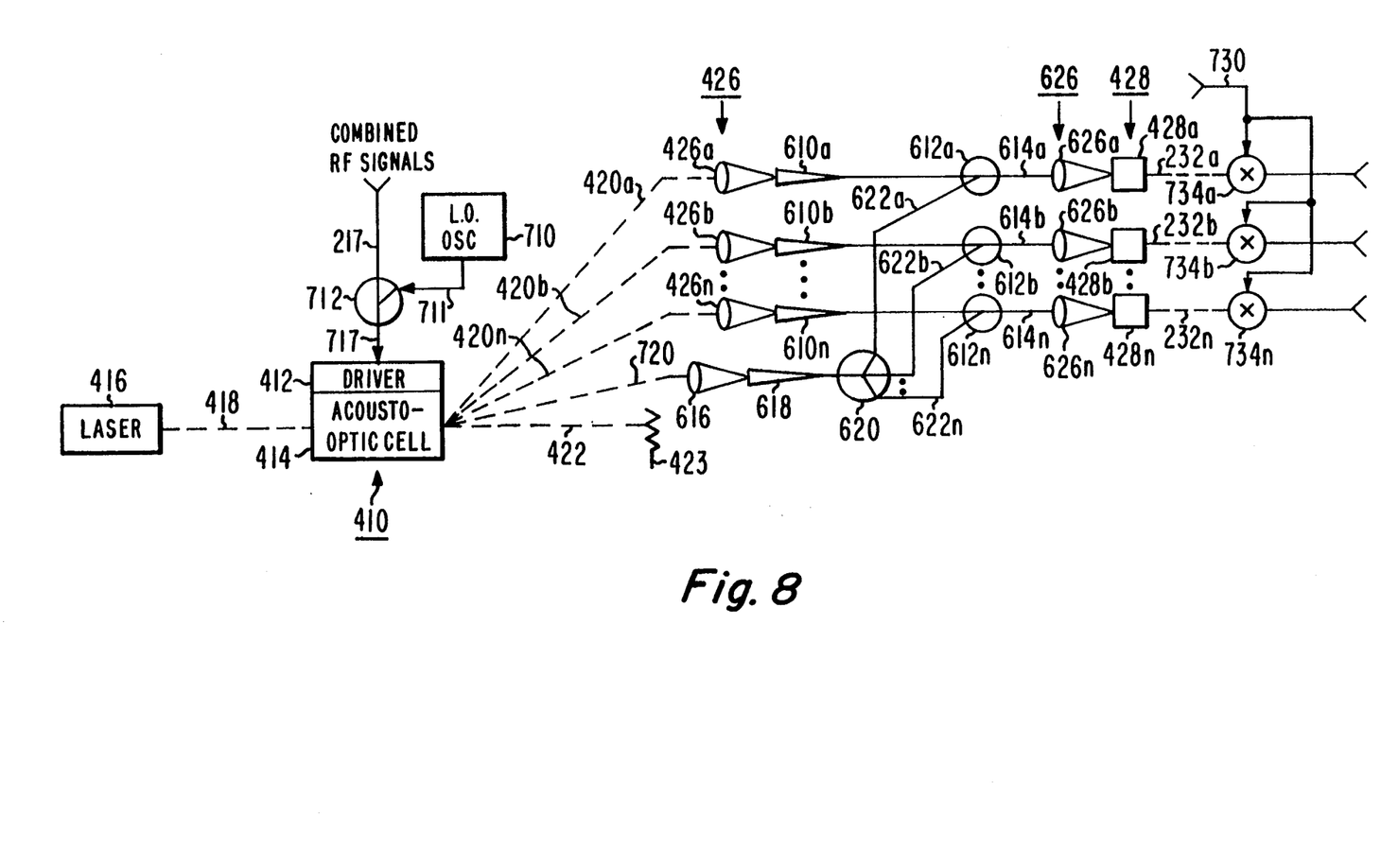
FIG. 8 is a simplified diagram of an optical RF demultiplexer in which the optical local oscillator beamlet is generated as in FIG. 7a, and in which the optical local oscillator and light information signals are propagated through a single-mode optical fiber.

FIG. 8 illustrates another arrangement according to the invention. In FIG. 8, elements corresponding to those of FIGS. 6 and 7a are designated by like reference numerals. In FIG. 8, laser 416 produces a light beam 418 which traverses medium 414 of an acoustooptic modulator 410. Beam 418 exits from cell 414 as beam 422, which is dissipated in a lossy termination 423. Combined RF information signals at different carrier frequencies are applied over a transmission path 217 to a combiner 712. An unmodulated RF L.O. signal from a generator 710 is applied to combiner 712 for combination with the RF information signals. The combined RF signals are applied over a transmission path 717 to drive 412 of modulator 410. The RF signals cause spatial modulation of output light from cell 410, forming a plurality of mutually diverging information beamlets 420a, 420b, . . . , 420n, where n is the number of RF information signal carriers, and also forming an unmodulated optical L.O. beamlet 720.

Optical L.O. (OLO) beamlet 720 of FIG. 8 is focused by a lens arrangement 616 onto the end of an optical fiber 618, and the OLO signal is split into n portions by a light splitter 620. One L.O. light portion is generated on each optical fiber 622a, 622b, . . . , 622n. Information signal beamlets 420a, 420b, . . . 420n are intercepted by lens arrangements 426a, 426b, . . . , 426n, respectively. If the beamlets are spread out spatially so that there is overlap at a significant level, an optical aperture array may be used as described in conjunction with FIG. 4. Each lens 426a, 426b, . . . 426n of lens array 426 focuses its corresponding information signal beamlet 420a, 420b, . . . 420n onto the end of an optical fiber 610a, 610b, . . . 610n, respectively. The information signals in the form of light travel through fibers 610a, 610b, . . . 610n and into couplers or adders 612a, 612b, . . . 612n, respectively, in which they are combined with optical L.O. signal carried over optical fibers 622a, 622b, ..., 622n, respectively. The combined light information signals and L.O. signals are applied through focusing lenses of an array 626 onto optical detectors of an array 428. More particularly, the combined light information signal and L.O. signal from combiner 612a of FIG. 8 is applied through a length of single-mode optical fiber 614a and through a focusing lens arrangement 626a to produce a spot on photodetector 428a; combined light information signal and L.O. signal from combiner 612b is applied through a length of single-mode optical fiber 614b and through a focusing lens arrangement 626b to produce a spot on photodetector 428b, ..., and combined light information signal and L.O. signal from combiner 612n is applied through a length of single-mode optical fiber 614n and through a focusing lens arrangements 626n to produce a spot on photodetector 428n. Each photodetector performs a combinatorial or nonlinear process, as known per se, to reconstitute an RF signal with its information content intact, at a frequency differing from that of the original RF signal frequency by the frequency of L.O. source 710. The reconstituted and demultiplexed signals appear on transmission paths 232a, 232b, ..., 232n.

Also illustrated by phantom lines in FIG. 8 is an arrangement similar to that of FIG. 7b, including an array 734 of mixers 734a, 734b, ..., 734n, which are coupled to transmission paths 232a, 232b, ..., 232n, respectively, for, if desired, mixing the reconstituted signals with a sample of the RF L.O. signal from generator 710, to thereby generate information signals at the same frequencies as those of the original RF signal carriers.

Other embodiments of the invention will be apparent to those skilled in the art. For example, instead of being coupled through focussing lenses 626, each single-mode optical fiber 614 can be physically attached to the photosensitive region of its photodetector, thus reducing the mass of the structure, and reducing the possibility of mispositioning of the beams due to environmental considerations. While the source light beam has been described as coherent, incoherence merely degrades the performance, and a level of incoherence may be acceptable in some systems.

What is claimed is:

1. A demultiplexer for a plurality of radio-frequency signals at disparate frequencies, comprising:
    a light source for generating a source light beam;
    an electrooptic modulator coupled to said light source for receiving said source light beam and also coupled for receiving said plurality of radio-frequency signals, for generating a plurality of information beamlets spatially diverging from each other, and frequency modulated, in response to said radio-frequency signals;
    means for generating optical local oscillator signal;
    a single-mode first optical fiber including at least an output port;
    spatial coupling means optically coupled to said electrooptic modulator and to said first optical fiber for coupling one of said beamlets into said first optical fiber to the substantial exclusion of others of said beamlets, and for coupling at least a portion of said optical local oscillator signals into said first optical fiber, whereby light from said one of said beamlets and said optical local oscillator signals propagate together through said first optical fiber, and exit said first optical fiber with their wavefronts mutually aligned; and
    optical detector means coupled to said output port of said first optical fiber for generating a replica of said radio-frequency signals associated with said one of said beamlets.

2. A demultiplexer according to claim 1, wherein said means for generating optical local oscillator signals comprises:
    a source of radio-frequency local oscillator signals;
    radio-frequency coupling means coupled to said source of radio-frequency local oscillator signals and to said electrooptic modulator, for coupling unmodulated radio-frequency local oscillator signals to said electrooptic modulator, whereby said optical local oscillator signals are generated as a beamlet which diverges from said information beamlets resulting from said radio-frequency signals.

3. A demultiplexer according to claim 2 wherein said spatial coupling means further comprises:
    means for coupling at least a portion of said optical local oscillator signals into a second optical fiber; and
    optical fiber combining means coupled to said first and second optical fibers for coupling said portion of said optical local oscillator signals into said first optical fiber.

4. A demultiplexer according to claim 1, wherein said means for generating optical local oscillator signals comprises:
    optical beam splitting means coupled to said light source for splitting said source light beam to generate said optical local oscillator signals; and
    said spatial coupling means comprises at least a lens for coupling said optical local oscillator signals from said beam splitting means to said first optical fiber.

5. A demultiplexer according to claim 1, wherein said spatial coupling means comprises an array of apertures, at least one of which is located to pass one of said information beamlets, and to block others of said information beamlets, to thereby form mutually isolated information beamlets; and
    optical coupling means coupled to said one of said apertures, for coupling said one of said isolated information beamlets into said first optical fiber.

6. A demultiplexer according to claim 1, wherein said light source generates a coherent source beam.

7. A spacecraft, comprising:
    receiving antenna means for receiving a plurality of radio frequency signals at disparate frequencies, which radio-frequency signals are to be separated, said spacecraft comprising:
    a light source for generating a source light beam;
    an electrooptic modulator coupled to said light source for receiving said source light beam and also coupled for receiving said plurality of radio-frequency signals, for generating a plurality of information beamlets spatially diverging from each other, and frequency modulated, in response to said radio-frequency signals;
    means for generating optical local oscillator signal;
    a single-mode first optical fiber including at least an output port;
    spatial coupling means optically coupled to said electrooptic modulator and to said first optical fiber for coupling one of said beamlets into said first optical fiber to the substantial exclusion of others of said beamlets, and for coupling at least a portion of said optical local oscillator signal into said first optical fiber, whereby light from said one of said beamlets and said optical local oscillator signals propagate together through said first optical fiber, and exit said first optical fiber with their wavefronts mutually aligned; and optical detector means coupled to said output port of said first optical fiber for generating a replica of said radio-frequency signals associated with said one of said beamlets.

8. A spacecraft according to claim 7, wherein said means for generating optical local oscillator signals comprises:

a source of radio-frequency local oscillator signals;

radio-frequency coupling means coupled to said source of radio-frequency local oscillator signals and to said electrooptic modulator, for coupling unmodulated radio-frequency local oscillator signals to said electrooptic modulator, whereby said optical local oscillator signals are generated as a beamlet which diverges from said information beamlets resulting from said radio-frequency signals.

9. A method for demultiplexing a plurality of frequency-multiplexed radio-frequency signals, comprising the steps of:

applying said radio-frequency signals to an electrooptic modulator;

applying a light beam to said electrooptic modulator, thereby generating a plurality of mutually diverging, frequency modulated signal beamlets of light in response to said radio-frequency signal;

generating a beam of optical local oscillator signals;

coupling at least a portion of said beam of optical local oscillator signals to a single-mode optical fiber;

coupling one of said signal beamlets to said optical fiber to the exclusion of others of said signal beamlets;

propagating said one of said signal beamlets and said optical local oscillator signal through said optical fiber together for a distance sufficient to render their wavefronts substantially parallel; and after said propagating step, coupling said one of said signal beamlets and said portion of said optical local oscillator signal to an optical detector.

10. A method according to claim 9, wherein said step of generating a beam of optical local oscillator signal comprises the steps of:

generating an unmodulated radio-frequency local oscillator signal; and coupling said radio frequency local oscillator signal to said electrooptic modulator.

11. A demultiplexer for demultiplexing a plurality of radio-frequency carrier signals at disparate frequencies produced by a source of radio-frequency carrier signals, said demultiplexer comprising:

a light source for generating a source light beam;

an electrooptic modulator coupled to said light source for receiving said source light beam, for spatially and frequency modulating said source light beam in response to radio-frequency carrier signals applied thereto;

radio-frequency carrier signal coupling means coupled to said source of radio-frequency carrier signals and to said electrooptic modulator, for coupling said radio-frequency carrier signals to said electrooptic modulator, whereby said electrooptic modulator generates a plurality of signal beamlets spatially diverging from each other and frequency modulated in response to said radio frequency signals;

RF local oscillator signal generating means for generating unmodulated radio-frequency local oscillator signals;

RF local oscillator signal coupling means coupled to said RF local oscillator signal generating means and to said electrooptic modulator, for coupling said RF local oscillator signals to said electrooptic modulator, whereby said electrooptic modulator produces a local oscillator beamlet diverging from said signal beamlets;

electrooptic detector means for generating electrical signals in response to light applied thereto; and spatial coupling means coupled to said electrooptic modulator and to said electrooptic detector means, for coupling one of said signal beamlets and at least a portion of said local oscillator beamlet to said electrooptic detector.

12. A demultiplexer according to claim 11, wherein:

said radio-frequency carrier signal coupling means comprises a first RF transmission line; and said RF local oscillator signal coupling means comprises:

transmission line coupling means including a first input port coupled to said first RF transmission line, a second input port coupled to said RF local oscillator signal generating means, and also including an output port coupled to said electrooptic modulator for applying said radio-frequency carrier signals and said RF local oscillator signals to said electrooptic modulator.

13. A demultiplexer according to claim 11, wherein said spatial coupling means comprises:

a signal-mode first optical fiber including an output port optically coupled to said electrooptic detector means;

first beamlet coupling means located to intercept a selected one of said signal beamlets, for coupling said one of said signal beamlets to said first optical fiber, whereby said one of said beamlets propagates through said first optical fiber to said electrooptic detector means;

a second optical fiber coupled to said first optical fiber; and optical local oscillator beamlet coupling means located to intercept at least a portion of said local oscillator beamlet and for coupling said portion of said local oscillator beamlet by way of said first optical fiber to said electrooptic detector means.

14. A demultiplexer according to claim 11, wherein said light source generates a coherent source light beam.

15. A spacecraft, comprising:

an antenna for receiving a plurality of radio-frequency signals at disparate frequencies, which radio-frequency signals are to be demultiplexed;

a light source for generating a source light beam;

an electrooptic modulator coupled to said light source for receiving said source light beam, and for spatially and frequency modulating said light beam in response to signals applied thereto;

radio-frequency carrier signal coupling means coupled to the source of radio-frequency carrier signals and to said electrooptic modulator, for coupling said radio-frequency carrier signals to said electrooptic modulator, whereby said electrooptic modulator generates a plurality of signal beamlets, both spatially diverging from each other and frequency modulated, in response to said radio frequency signals;

RF local oscillator signal generating means for generating unmodulated radio-frequency local oscillator signals;

RF local oscillator signal coupling means coupled to said RF local oscillator signal generating means and to said electrooptic modulator, for coupling said RF local oscillator signals to said electrooptic modulator, whereby said electrooptic modulator produces a local oscillator beamlet diverging from said signal beamlets;

electrooptic detector means for generating electrical signals in response to light applied thereto; and spatial coupling means coupled to said electrooptic modulator and to said electrooptic detector means, for coupling one of said signal beamlets and at least a portion of the light from said local oscillator beamlet to said electooptic detector.

16. A spacecraft according to claim 15, wherein:

said radio-frequency carrier signal coupling means comprises a first RF transmission line; and said RF local oscillator signal coupling means comprises:

a second RF transmission line coupled to said RF local oscillator signal generating means; and transmission line coupling means including a first input port coupled to said first RF transmission line, a second input port coupled to said second RF transmission line, and also including an output port coupled to said electrooptic modulator for applying said radio-frequency carrier signals and said RF local oscillator signal to said electrooptic modulator.

17. A method for demultiplexing a plurality of radio-frequency carrier signals at disparate frequencies, comprising the steps of:

applying a beam of light to an electrooptic frequency and spatial modulator;

generating unmodulated radio-frequency local oscillator signals;

applying said radio-frequency carrier signals and said radio-frequency local oscillator signals to said electrooptic modulator, whereby a plurality of mutually diverging beamlets, including signal beamlets and a local oscillator beamlet, are generated in response to said radio-frequency carrier signals and said radio frequency local oscillator signals, respectively;

coupling one of said signal beamlets to an optical detector to the exclusion of other ones of said signal beamlets; and coupling at least a portion of said local oscillator beamlet to said optical detector.

18. A method according to claim 17, wherein:

said step of coupling one of said signal beamlets comprises the step of coupling said one of said signal beamlets to a single-mode first optical fiber; and said step of coupling said portion of said local oscillator beamlet comprises coupling said portion of said local oscillator beamlet to said first optical fiber.

19. A method according to claim 17, wherein:

said step of applying a beam of light includes the step of applying a coherent beam of light.

20. A demultiplexer for a plurality of radio-frequency signals at disparate frequencies, comprising:

a light source for generating a source light beam;

an electrooptic modulator coupled to said light source for receiving said source light beam and also coupled for receiving said plurality of radio-frequency signals, for generating a plurality of information beamlets both spatially diverging from each other and frequency modulated in response to said radio-frequency signals;

means for generating optical local oscillator signals;

a spatial array of optical detector means; and spatial coupling means optically coupled to said electrooptic modulator, to said means for generating optical local oscillator signals, and to said spatial array of optical detector means, for coupling each one of said beamlets into a corresponding one of said optical detector means of said spatial array to the substantial exclusion of others of said beamlets, and for coupling at least a portion of the power of said optical local oscillator signal into each of said detector means of said spatial array, whereby light from each of said beamlets and said optical local oscillator signals interact in one of said detector means of said spatial array, for generating a replica of said radio-frequency signals associated with said one of said beamlets.

* * * * *